(No Model.)
J. BOHLANDER, Jr.
VEHICLE HUB.
No. 251,090.  Patented Dec. 20, 1881.
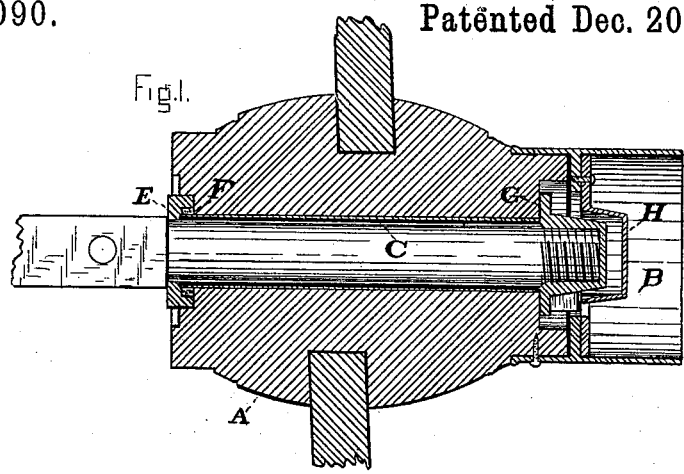
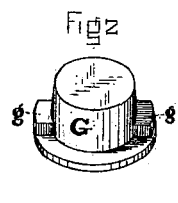
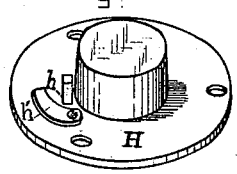
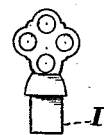
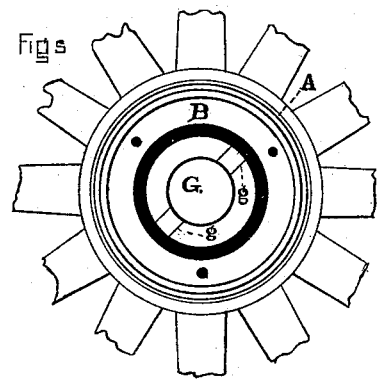
WITNESSES
Horatio V Croll
Alfred B. Benedict
INVENTOR
John Bohlander Jr
By Geo. J. Murray
Atty

UNITED STATES PATENT OFFICE.

JOHN BOHLANDER, JR., OF CINCINNATI, OHIO.

VEHICLE-HUB.

SPECIFICATION forming part of Letters Patent No. 251,090, dated December 20, 1881.

Application filed October 24, 1881. (No model.)

*To all whom it may concern:*

Be it known that I, JOHN BOHLANDER, Jr., of the city of Cincinnati, county of Hamilton, State of Ohio, have invented certain new and useful Improvements in Vehicle Wheels and Axles, of which the following is a specification.

The object of this invention is to inclose the axle and box, so as to prevent sand or other substances from entering and the lubricant from escaping. Its object is also a convenient means to prevent the nut from being lost, and to couple it with the wheel for the purpose of turning the nut onto or removing it from the axle. These objects are attained by means illustrated in the accompanying drawings, in which—

Figure 1 is an axial section of a hub provided with my improvements. Fig. 2 is a perspective view of my axle-nut. Fig. 3 is a similar view of the band-cap. Fig. 4 is a view of the coupling-key. Fig. 5 is an end view of the hub with band-cap removed.

Similar reference-letters indicate like parts wherever they occur.

The hub A, hub-band B, and axle-box C are of ordinary construction. The axle D is provided with a collar, E, which has a flange projecting from its rim into an annular groove cut in the end of the hub just around the axle-box. Between the end of the box and the collar is a washer, F, to lessen friction and protect the collar. The axle-nut G is closed at its outer end and has ribs $g$ projecting from its flange. The band-cap H is secured upon the inwardly-projecting flange of the hub-band B by screws passing through it into the flange. Through the flange of cap H is a perforation, $h$, through which a key, I, passes to engage the projections $g$ upon the nut and couple the hub and nut together, so that by turning the wheel the nut is screwed on or unscrewed from the axle. The perforation $h$ is guarded by an escutcheon, $h'$, when the key is withdrawn.

What I claim as new, and desire to secure by Letters Patent, is—

1. The combination, substantially as specified, of the axle and hub A and axle-box C with the flanged collar E, capped over the end of the axle-box and entering an annular groove in the hub, for the purpose set forth.

2. The combination, substantially as hereinbefore set forth, of the axle hub A and hub-band B with cap H, nut G, and collar E, capped over the end of the axle-box and entering an annular groove in the hub, for the purpose specified.

3. The combination, substantially as specified, of the axle and hub A with flanged hub-band B, perforated cap H, key I, and nut G, arranged to operate as specified.

JNO. BOHLANDER, JR.

Witnesses:
C. F. RAPP,
J. W. WEBER.